United States Patent
Sweeney et al.

(10) Patent No.: US 10,715,441 B2
(45) Date of Patent: Jul. 14, 2020

(54) SYSTEM AND METHOD OF A HIGH BUFFERED HIGH BANDWIDTH NETWORK ELEMENT

(71) Applicant: Arista Networks, Inc., Santa Clara, CA (US)

(72) Inventors: Adam James Sweeney, San Jose, CA (US); Hugh W. Holbrook, Palo Alto, CA (US)

(73) Assignee: Arista Networks, Inc., Santa Clara, CA (US)

(*) Notice: Subject to any disclaimer, the term of this patent is extended or adjusted under 35 U.S.C. 154(b) by 83 days.

(21) Appl. No.: 15/187,732

(22) Filed: Jun. 20, 2016

(65) Prior Publication Data

US 2017/0366476 A1  Dec. 21, 2017

Related U.S. Application Data

(60) Provisional application No. 62/214,627, filed on Sep. 4, 2015.

(51) Int. Cl.
| | |
|---|---|
| *H04L 12/947* | (2013.01) |
| *H04L 12/801* | (2013.01) |
| *H04L 12/861* | (2013.01) |
| *H04L 12/851* | (2013.01) |
| *H04L 12/863* | (2013.01) |

(52) U.S. Cl.
CPC .............. *H04L 47/12* (2013.01); *H04L 47/24* (2013.01); *H04L 47/29* (2013.01); *H04L 49/9078* (2013.01); *H04L 49/9089* (2013.01); *H04L 47/6215* (2013.01)

(58) Field of Classification Search
CPC ......... H04L 49/90; H04L 47/30; H04L 47/10; H04L 47/50; H04L 49/25; H04L 49/3027; H04L 49/901; H04L 49/3018
See application file for complete search history.

(56) References Cited

U.S. PATENT DOCUMENTS

| | | | |
|---|---|---|---|
| 8,797,877 B1 * | 8/2014 | Perla ...................... | H04L 49/90 370/230 |
| 2003/0095558 A1 * | 5/2003 | Chung .................. | H04L 47/623 370/417 |
| 2004/0125815 A1 * | 7/2004 | Shimazu ................. | H04L 47/10 370/411 |
| 2005/0213571 A1 * | 9/2005 | Barrack ................ | H04L 49/103 370/389 |

* cited by examiner

*Primary Examiner* — Sai Aung
(74) *Attorney, Agent, or Firm* — Fountainhead Law Group PC

(57) ABSTRACT

A method and apparatus of a network element that processes a packet in the network element is described. In an exemplary embodiment, the network element receives a data packet that includes a destination address. The network element receives a packet, with a packet switch unit, wherein the packet was received by the network element on an ingress interface. The network element further determines if the packet is to be stored in an external queue. In addition, the network element identifies the external queue for the packet based on one or more characteristics of the packet. The network element additionally forwards the packet to a packet storage unit, wherein the packet storage unit includes storage for the external queue. Furthermore, the network element receives the packet from the packet storage unit and forwards the packet to an egress interface corresponding to the external queue.

35 Claims, 13 Drawing Sheets

SYSTEM AND METHOD OF A HIGH BUFFERED HIGH BANDWIDTH NETWORK ELEMENT

RELATED APPLICATIONS

This application claims the benefit of U.S. Provisional Patent Application No. 62/214,627 filed Sep. 4, 2015, the disclosure of which is hereby incorporated by reference herein in its entirety.

FIELD OF INVENTION

This invention relates generally to data networking, and more particularly, to processing data packets using a packet switch unit that determines forwarding decisions for the data packets and a packet storage unit that queues the data packets for transmission.

BACKGROUND OF THE INVENTION

A network element, such as an Ethernet switch or router, typically operates in "store and forward" mode. In this mode of operations, the network element receives a packet on some "input port", makes a forwarding decision to decide which output port to send the packet to, and then transmits the packet on the output port. For this network element, transmission is not instantaneous, as a packet that is N bits long sent on an interface that can transmit at K bits per second, will take N/K seconds to transmit. As the packet is being processed for transmission, other packets may be queued for transmission using the same output port. The condition where packets are arriving faster than can be transmitted to some output port is referred to as "network congestion", or just "congestion." Network elements typically store packets in a queue in memory. If more memory is available for packet queuing, then the network element can sustain longer bursts of congestion without dropping one or more packets.

However, many Ethernet network elements are built with small buffers, for cost reasons. Furthermore, a high performance network element is commonly implemented using highly integrated silicon, such as a custom application-specific integrated circuit (ASIC) or field-programmable gate array (FPGA). In such a device, adding large memories can be prohibitively costly for many reasons, such as increasing the die-size of the integrated silicon, adding an increased number of off-chip memory interfaces to off-chip memory, and that the off-chip memory runs at slower speeds than the ASIC or FPGA.

SUMMARY OF THE DESCRIPTION

A method and apparatus of a network element that processes a packet in the network element is described. In an exemplary embodiment, the network element receives a data packet that includes a destination address. The network element receives a packet, with a packet switch unit, wherein the packet was received by the network element on an ingress interface. The network element further determines if the packet is to be stored in an external queue. In addition, the network element identifies the external queue for the packet based on one or more characteristics of the packet. The network element additionally forwards the packet to a packet storage unit, wherein the packet storage unit includes storage for the external queue. Furthermore, the network element receives the packet from the packet storage unit and forwards the packet to an egress interface corresponding to the external queue.

In another embodiment, the network element receives, with a packet storage unit, a packet from a packet switch unit via an interface coupling the packet storing unit and the packet switch unit, The network element further determines an external queue for the packet, wherein the external queue is associated with the packet storage unit. The network element additionally stores the packet in the external queue. Furthermore, in response to receiving a flow control message indicating packets may be sent from the external queue to the packet switch unit, the network element forwards the packet from the external queue to the packet switch unit.

In a further embodiment, the device includes a plurality of network interfaces that communicate a plurality of packets. The device further includes a data plane coupled to the plurality of network interfaces that processes the plurality of packets. The data plane further includes a plurality of external queues, a packet storage unit, and a packet switch unit. The plurality of external queue stores at least one of the plurality of packets prior to this packet being transmitted by the network element. The packet storage unit is coupled to the plurality of external queues and controls the storing of the at least one of the plurality of packets in the plurality of queues. The packet switch unit is coupled to the packet storage unit and includes a plurality of internal queues, where for each of the plurality of packets, receives that packet from a first network interface of the plurality of network interfaces. In addition, the packet switch unit further determines if that packet is to be stored in one of a plurality of external queues. If the packet is to be stored in the one of the plurality of external queues, the data plane identifies which of the plurality of external queues for that packet based on one or more characteristics of that packet, forwards that packet to the packet storage unit, and receives that packet from the packet storage unit. If the packet is not to be stored in the one of the plurality of external queues, the data plane stores the packet in one of the plurality of internal queues.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
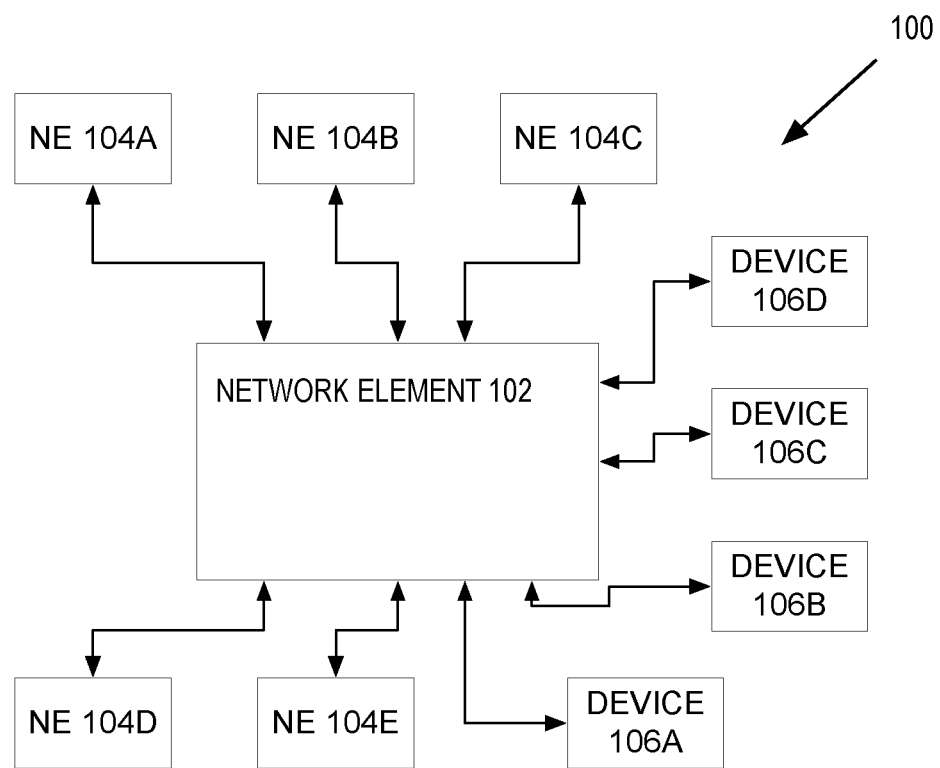
FIG. 1 is a block diagram of one embodiment of a network element that communicates data packets with devices and other network elements.

A method and apparatus of a network element that processes a packet in the network element is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a network element that processes a packet in the network element is described. In one embodiment, the buffering needs of a network element may not be symmetric on all ports. For example and in one embodiment, one or more of the ports may be coupled to device(s) that generate or receive high levels of packets, while other ports are coupled to device(s) that may generate low levels of packets. Thus, in some cases, most of the congestion in a network element occurs from packets destined for (or arriving on) a subset of the switch ports, and this observation allows for a better solution to the "buffering problem" than prior alternatives.

In one embodiment, the network element includes a small buffered packet switch unit with n pin interfaces that is combined with a large-buffered packet storage unit to produce a "partially large-buffered" device with n-m externally-visible pin interfaces, where m of the pin interfaces are designated as "externally-queued" (EQ) interfaces with associated large buffers. In this embodiment, any packet arriving on one of m EQ interfaces is directed to packet storage unit 304 for queuing in the larger buffers associated with the packet storage unit. While in one embodiment, the large buffers associated with the packet storage unit are in one or more memory chips that are coupled to the packet storage unit, in alternate embodiments, the buffers are on the packet storage unit.

In this network element, a packet received on one of the EQ pin interfaces and destined for interface J, queue Q remains queued in the memory of packet storage unit until a flow control channel from the packet switch unit to the packet storage unit indicates to the packet storage unit that the packet switch unit has room for a packet to interface J and queue Q. If more than one queue on the packet storage unit is associated with one queue on the packet switch unit, then the packet storage unit uses a scheduling and prioritization mechanisms to decide which packet to send to the packet switch unit. In one embodiment, the packet switch unit uses a flow control channel to indicate to the packet storage unit when the packet storage unit should transmit a packet to the packet switch unit. The flow control channel is used such that the packet switch unit does not drop any packets. In one embodiment, the flow control information may be carried over a special dedicated connection from packet switch unit and packet storage unit "out-of-band", or flow control information may be carried "in-band" using one or more of the m pin interfaces that connect packet switch unit and packet storage unit. In one embodiment, this type of flow control is called an internal flow control as the internal flow control is used to control packet transmission between the packet switch unit and the packet storage unit.

FIG. 1 is a block diagram of one embodiment of a network element 102 that communicates data packets with devices 106A-D and/or other network elements 104A-E. In FIG. 1, the system 100 includes the network element 102 that is coupled with network elements 104A-E and/or devices 106A-D. In one embodiment, each of the network element 102 and network elements 104A-E can be a switch, router, hub, bridge, gateway, etc., or any type of device that can communicate data packets with a network. In one embodiment, any one of the network elements 102 or 104A-E can be a virtual machine. In one embodiment, the device 106A-D is any type of device that can communicate network data with another device (e.g., a personal computer, laptop, server, mobile device (e.g., phone, smartphone, personal gaming device, etc.), another network element, etc.). In one embodiment, the devices 106A-D can be a virtual machine or can be a device that hosts one or more virtual machines. While in one embodiment, network element 102 is coupled to five network elements and four devices, in alternate embodiments, the network elements can be coupled to a different mix of other network elements and/or devices (e.g., more or less network elements, more or less devices, only network elements, only devices, and/or another types of combination of network elements and/or devices).

A network element, such as an Ethernet switch, router, or network element 102, typically operates in "store and forward" mode. In this mode of operations, the network element receives a packet on an input port, makes a forwarding decision to decide which output port to send it to, and then transmits it on the output port. Transmission is not instantaneous as a packet that is N bits long sent on an interface that can transmit at K bits per second, will take N/K seconds to transmit. While a packet P1 is being transmitted to interface I, if a second packet P2 is also forwarded to I, per the network element's 102 forwarding decision, the second packet is queued, or "buffered", for later transmission (after P1 is done being transmitted). The condition where packets are arriving faster than they can be transmitted to some output port is referred to as "network congestion", or just "congestion." Network elements typically store packets in some sort of queue in memory. If more memory is available for packet queuing, then the switch can sustain longer bursts of congestion without dropping traffic.

In one embodiment, Ethernet network elements with larger packet buffers perform better in situations of network congestion than switches with smaller packet buffers. This increased buffering allows a switch to absorb rather than drop more packets, avoiding costly transmission control protocol (TCP) timeouts and retransmissions. Thus, larger buffers improve fairness when multiple TCP flows are contending for limited bandwidth on a single link.

Many Ethernet network elements, however, are built with small buffers for cost reasons. A high performance network element can be implemented using highly integrated silicon, such as a custom ASIC or FPGA. In such a device, adding large memories can be prohibitively costly for many reasons. For example, adding sufficient on-chip memory to improve performance increases the die size of the integrated silicon, which can substantially increase cost. Second, adding off-chip memory requires external interfaces. In the most demanding case of N interfaces all sending packets to one interface, a network element stores $(N-1)/N$ of the incoming packets in memory for a period of time. This requirement effectively doubles the external interface speed of a device, which also increases the cost. Third, commonly-available external memory technology is based on a parallel bus in which each "pin" runs at a slower speed than the interfaces on which the packets arrive. Thus, even more pins need to be devoted to external memory, which further increases the device cost. Accordingly, it is desirable to advance the state of the art by creating a network element that can store packets in memory when needed, without requiring either a large internal memory, or high-bandwidth external memory interfaces.

Furthermore, not all of the network element 102 ports would experience congestion or the same amount of congestion. For example and in one embodiment, if network element 104E is transmitting packets for network element 104B via network element 102 at a data rate of 8 gigabits/sec (Gbps), where the link between network elements 102 and 104B is 10 Gbps, and, in addition, the devices 106A-D are each bursting packets at a rate 1 Gbps to network 104B, there is congestion for the link between network elements 102 and 104B. In this example, a larger queue to store the packets from the devices 106A-D and/or network element 104E being transmitted reduces the likelihood that some of these packets being transmitted will be dropped.

Figure 2:
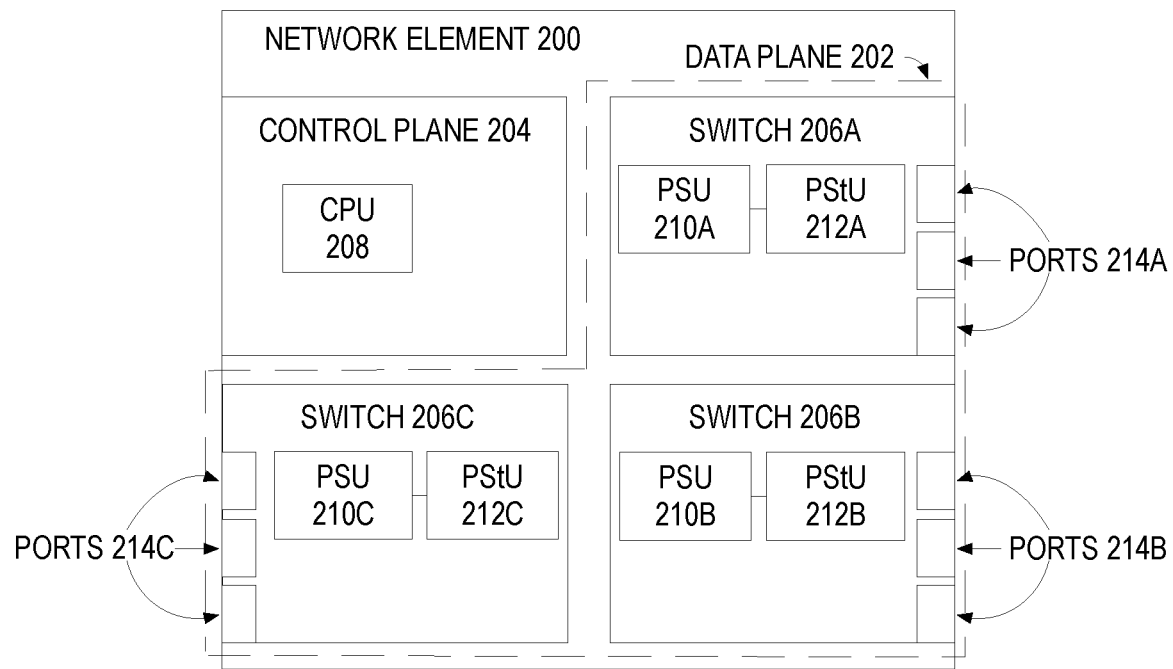
FIG. 2 is a block diagram of one embodiment of a network element that includes a control plane and multiple data planes.

FIG. 2 is a block diagram of one embodiment of a network element 200 that includes a control plane 204 and a data plane 202. In FIG. 2, the network element 200 includes a data plane 102 and a control plane 104. In one embodiment, the data plane 202 receives, processes, and forwards network data using various configuration data (e.g. packet forwarding (routing, switching, or another type of packet forwarding), security, quality of service (QoS), and other network traffic processing information). For example, for each received packet of the network traffic, the data plane determines a destination address of that packet, looks up the requisite information for that destination in one or more tables stored in the data plane, and forwards the packet out the proper outgoing interface. The data plane 202 includes multiple switches 206A-C that can each receives, process, and/or forward network traffic. In one embodiment, each switch 206A-C includes a packet switch unit 210A-C, packet storage unit 212A-C and ports 214A-C, respectively. As will be described further below, the packet switch unit 210A-C is a chip that is used to make processing decisions for each packet received by the corresponding switch 206A-C and the packet storage unit 212A-C is used to queue packets received on interfaces that are configured for external queuing.

In one embodiment, the control plane 204 gathers the configuration data from different sources (e.g., locally stored configuration data, via a command line interface, or other management channel (e.g., SNMP, Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NetConf), Secure Shell (SSH), and/or another management protocol) and writes this configuration data to one or more tables.

Figure 3A:
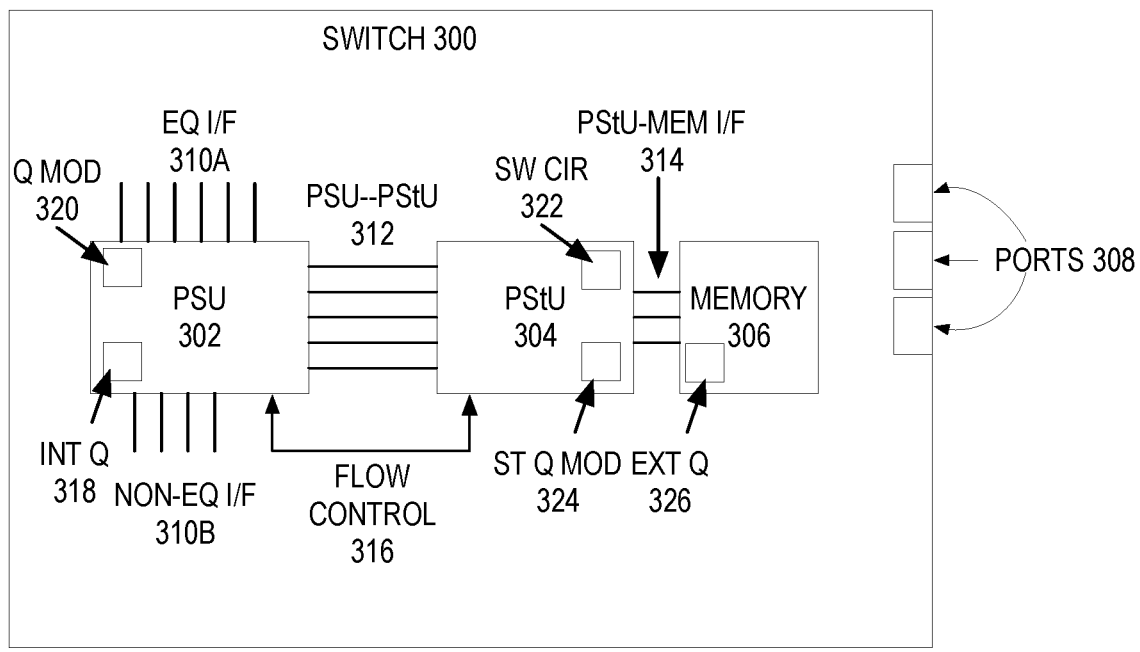
FIG. 3A is a block diagram of one embodiment of a switch component that includes a packet switch unit, packet storage unit, and memory.

FIG. 3A is a block diagram of one embodiment of a switch component 300 of a data plane that includes a packet switch unit 302, packet storage unit 304, and memory 306. In FIG. 3, the switch component 300 includes the packet switch unit 302 coupled to the packet storage unit 304 via the packet switch unit-packet storage unit interfaces (PSU-PStU) 312. In one embodiment, the PSU-PStU interface can be an Ethernet interface or a type of non-Ethernet interface (e.g., cellular fabric, packetized link, Infiniband, or another type of interface whether proprietary or non-proprietary). The packet storage unit 304 is further coupled to memory 306 via packet storage unit-memory interfaces (PStU-Mem) 314. In one embodiment, the packet switch unit 302 includes n pin interfaces that couple the packet switch unit 302 to ports 308 and the packet storage unit 304. In one embodiment, a pin interface is an interface on either the packet switch unit 302 or packet storage unit 304 that couples that chip to another component of the network element and communicates a packet through that interface. For example and in one embodiment, a pin interface of the packet switch unit 302 can be an interface coupling the packet switch unit 302 with the packet storage unit 304, in which this interface is used to transfer packets between the two chips. In another example, a pin interface of the packet switch unit 302 can be an interface coupling the packet switch unit 302 to a network interface or port of the network element. In this example, the packet switch unit 302 can communicate packets with a port via this pin interface. While in one embodiment, each of the packet switch unit 302, packet storage unit 304, and memory 306 are illustrated as one chip, in alternate embodiments, each of the packet switch unit 302, packet storage unit 304, and memory 306 can be more that one chip. For example and in one embodiment, the memory 306 can include multiple memory chips that are used for the external queues.

The packet switch unit 302 further includes internal queues 318 that are used to queue packets prior to the packets being forwarded to a port that is part of the switching component or another port in the network element. The packet switch unit 302 also includes a queue module 320 that manages the decision to store the packet in an internal or external queue. In one embodiment, the packet storage unit 304 includes switch circuitry 322 to process the packet and storage queue module 324 to manage the de-queuing of externally stored packets stored in an external queue.

In one embodiment, the buffering needs of a network element are not symmetric on all ports. For example and in one embodiment, one or more of the ports may be coupled to device(s) that generate or receives high levels of packets, while other ports are coupled to device(s) that may generate low levels of packets. Thus, in some cases, most of the congestion in a network element occurs from packets arriving on a subset of the switch ports, and this observation allows for a solution to handle congestion on the ports that exhibit the congestion.

In one embodiment, the small buffered packet switch unit 302 with n pin interfaces is combined with the packet storage unit 304 to produce a "partially large-buffered" device with n-m externally-visible pin interfaces, where m of the pin interfaces are designated as "externally-queued" (EQ) interfaces with associated large buffers. In this embodiment, any packet arriving on one of m EQ interfaces is directed to packet storage unit 304 for queuing in the larger memory associated with the packet storage unit 304. In another embodiment, the memory is not external and instead exists inside the packet storage unit, as described in FIG. 3B below.

As illustrated in FIG. 3A, and in one embodiment, the packet switch unit 302 is coupled to the packet storage unit 304 via the m pin interfaces (PSU-PStU interface 312). In addition, m of the externally-visible pin interfaces on packet switch unit 302 (EQ interfaces 310A) are designated as "externally-queued" (EQ) interfaces. Furthermore, the packet switch unit 302 includes n−2m externally visible pin interfaces that are designated non-EQ interfaces (310B). The packet switch unit 302 further includes a "flow control" connection 316 from the packet switch unit 302 to packet storage unit 304. In one embodiment, the flow control connection 316 is employed to allow packet switch unit 302 to tell packet storage unit 304 when to send externally queued packets to the packet switch unit 302.

A packet arriving on an EQ interface is not subject to the normal forwarding rules of the network device. Instead, a packet arriving on an EQ interface $I_k$ whose forwarding decision is to send this packet to queue Q on network interface J, is NOT sent to interface J, but rather to the packet storage unit 304 by way of interface $I_{(n+m-k)}$, with an indication of the forwarding result (interface J, queue Q). In one embodiment, each EQ pin interface on the packet switch unit 302 has an associated storage pin interface (e.g., one of the pin interfaces from PSU-PStU interfaces 312) between packet switch unit 302 and packet storage unit 304 with equivalent bandwidth to that EQ pin interface. In this embodiment, having the same bandwidth on the EQ pin interface and the storage pin interface, the chance of congestion is reduced or eliminated on the link from packet switch unit 302 to packet storage unit 304. Thus, in this embodiment, no queue ever accumulates too many packets in packet switch unit 302 on any of the interfaces that connect to packet storage unit 304. In one embodiment, there are multiple ways to achieve this property. For example and in one embodiment, by having a smaller number of higher-speed storage pin interfaces between packet switch unit 302 and packet storage unit 304 and mapping each of EQ pin interfaces to one of these higher-speed storage pin interfaces, reduces or eliminates the change of congestion between packet switch unit 302 and packet storage unit 304.

In one embodiment, the communication of the forwarding decision from packet switch unit 302 to packet storage unit 304 may be done in multiple ways:

- A special-purpose packet header that carries the final interface and queue.
- An 802.1q Virtual Local Area Network (VLAN) tag to identify the final interface and queue.
- A Multiprotocol Label Switching (MPLS) header to identify the final interface and queue.
- The final destination can be implied from the network header of the packet sent from packet switch unit 302 to packet storage unit 304. The actual destination port and queue would be derived by a lookup in packet storage unit 304. For instance, if the combined device is acting as an Internet Protocol (IP) router operating on Ethernet packets, the Ethernet destination address of the packet switch unit 302-to-packet storage unit 304 packet could be rewritten by packet switch unit 302, and then this address could be retrieved from the packet and looked up by packet storage unit 304 to determine the ultimate port and queue.
- A combination of the above techniques may be used. For instance, the Ethernet destination address may be used to derive the ultimate interface, and an identifier for the queue on that interface may be explicitly carried in the packet header, such as the Priority Code Point field of the IEEE 802.1q Ethernet header.

In an alternative embodiment, packets arriving on EQ pin interfaces $I_l$ to $I_m$ (310A) have no forwarding decisions or lookups made in packet switch unit 302. Instead, the packet is sent to the packet storage unit 304 by way of the associated interface, and the packet storage unit 304 makes the forwarding and queuing decisions for this packet.

Queuing on the Packet Storage Unit

The packet storage unit 304, in one embodiment, has the ability to receive and queue packets, and to schedule packets for transmission and de-queue them and send them over the packet storage unit 304-to-packet switch unit 302 link. In this embodiment, packet storage unit 304 is a commercially available general purpose Ethernet switch module with queuing and scheduling capability that includes one or more chips. This embodiment leverages the favorable economics associated with commonly available off-the-shelf silicon. In another embodiment, the packet storage unit 304 is a dedicated queuing chip with limited or no forwarding or lookup tables but only the queuing functionality. This implementation leverages the favorable economics associated with the limited functionality. By eliminating the ternary content-addressable memories (TCAMs), memories, and/or tables needed to perform a full routing or switching lookup, significant cost savings may be achieved for the packet storage unit 304. Moreover, further savings accrue in this embodiment because packet storage unit 304 can have significantly fewer external pin interfaces than packet switch unit 302. For example and in one embodiment, the packet storage unit 304 has m pin interface whereas packet switch unit 302 has n=2m+k, where k is the number of non-EQ pin interfaces on packet switch unit 302.

In one embodiment, there maybe multiple external queues associated with the packet storage unit 304 and/or multiple internal queues on the packet switch unit 302 that are associated with one pin interface. For example and in one embodiment, a particular network interface J is coupled to a pin interface J' on the packet switch unit and the network interface J is an EQ interface. Thus, packets received on network interface J interface are sent to the packet storage unit 304 to be queued in an external queue for the egress interface for this packet. In this example, there are 8 external queues for the egress interface, so the packet is queued in one of these queues. Which external queue to use is based on the queuing decision made for the packet. Furthermore, each of these external queues is associated with a corresponding internal queue on the packet switch unit 302. In one embodiment, each of the external and internal queues is a virtual output queue, where a virtual output queue is a queue that is used for each possible output location.

In another embodiment, the forwarding lookup and queuing decision is made by a combination of lookups in the packet switch unit 302 and the packet storage unit 304. For example and in one embodiment, input filtering and a forwarding lookup may be done in the packet switch unit 302, whereas determining the output queue on the egress network interface is decided by a lookup in the packet storage unit 304. Other processing combinations for the packet switch unit 302 and the packet storage unit 304 are possible as well. By splitting the lookups and/or other processing of a packet across the packet switch unit 302 and the packet storage unit 304, the packet processing can take advantage of the unique capabilities of each chip. For example and in one embodiment, the packet processing can be done in the packet switch unit 302, if the packet switch unit 302 has larger lookup tables or is more capable than packet storage unit 304.

In one embodiment, each of the packet switch unit 302 and the packet storage unit 304 maintains a set of queues for each of the n-m external pin interfaces on the packet switch unit 302. In this embodiment, the packet storage unit 304 has at least one queue associated with each queue in the packet switch unit 302. In another embodiment, each queue in packet storage unit 304 is associated with only one queue in packet switch unit 302.

In one embodiment, any packet arriving at packet storage unit 304 from packet switch unit 302 is queued into the appropriate queue on packet storage unit 304, as determined by the forwarding result sent from packet switch unit 302 to packet storage unit 304. In another embodiment, packet storage unit 304 can determine the appropriate queue to use for a packet based on the packet characteristics. In this embodiment, the packet storage unit 304 can make some or all of the queuing decisions for packets that are queued in the packet storage unit 304 instead or in conjunction with the packet switch unit 302. This can be used if the packet switch unit 302 does not have the full information regarding the queuing structure of the queues for packet storage unit 304 or to save bandwidth between the packet switch unit 302 and the packet storage unit 304.

In one embodiment, the packet storage unit 304 can further perform queue shaping and queue scheduling on the packets stored in the external queues controlled by the packet storage unit 304. Queue shaping is a mechanism for rate limiting the rate at which data can flow through a queue. It allows network element to configure limits on the maximum bit rate at which data is dequeued from the queue. Typically, this will be less than the speed at which the interface the queue serves can actually transmit data. Queue shaping can be used to put controls on the rate of high priority traffic or to limit the data rate to something agreed on with the "customer" at the other end. For example and in one embodiment, one customer might have a physical connection that can run at 100 Mbps, but the customer has only paid for 10 Mbps service, so the network element shape the queue for traffic going to the customer to a maximum of 10 Mbps.

In another embodiment, queue scheduling is the means by which the network element decides which queue to draw the next packet from when there is more than one queue serving a given interface. In the simplest case, there are two queues serving an interface, and the network element decides which queue to pull a packet from next. One common scheme for queue scheduling is Strict Priority (SP), where each queue gets a priority, and the queue with the highest priority that actually has a packet is always served first. Another is Weighted Round Robin (WRR), where the queues are served in turn, but the amount served from each queue each turn is controlled by a weight value assigned to the queue. This allows the network element to assign 75% of the throughput to the highest priority queue and 25% to the lower priority queue. Furthermore, there are many variations of WRR, such as Deficit Round Robin, Deficit Weighted Round Robin, Weighted Fair Queuing, Min Bandwidth and/or any other variant of WRR. Alternatively, the network element can use another type of queue scheduling.

In one embodiment, the packet store chip 304 uses one or more of the types of queue shaping and/or queue scheduling described above to determine which of the packets stored in the external queues. In this embodiment, when the flow control between the packet switch unit 302 and the packet store chip 304 indicates that packets can be sent to the packet switch unit 302 for a certain queue or interface associated to the packet switch unit 302, the packet store chip 304 can perform the queue shaping and/or queue scheduling to determine which of the externally queued packets are transmitted to the packet switch unit 302. For example and in one embodiment, consider the arrangement if there is one internal queue for an interface on the packet switch unit 302 and there are multiple external queues on the packet storage unit 304 for this interface. In this example, when the flow control indicates that packets can be sent to the internal queue (e.g., packet storage unit 304 receives an XON message indicating the internal queue for the interface is ready to receive packets from the packet storage unit 304), the packet storage unit 304 uses the shaping and/or queue scheduling to determine which of the externally queued packets in these four external queues to transmit to the packet switch unit 302. As another example, the four external queues could correspond to different QoS levels, with one or more of the external queues corresponding to higher priority queue(s) and one or more of the external queues corresponding to lower priority queue(s).

In a further example, there are can be more than one internal queue for an interface and multiple external queues also for that interface. In this example, the packet storage unit 304 performs queue shaping and/or queue scheduling to determine which of the externally queued packets are transmitted to the packet switch unit 302 and the packets switch unit 302 can perform the same or different queue shaping and/or queue scheduling to determine which of the internally queued packets are transmitted out the interface.

Flow Control Between the Packet Switch Unit and the Switch Storage Ship

A packet destined for network interface J, queue Q remains queued in the memory of packet storage unit 304 until the flow control channel from the packet switch unit 302 to the packet storage unit 304 indicates to the packet storage unit 304 that the packet switch unit 302 has room for a packet to network interface J and queue Q. In one embodiment, the flow control channel indicates when packets can be transmitted from the packet storage unit 304 to the packet switch unit 302. In one embodiment, the flow control channel can be used to send flow control message between the packet switch unit 302 and the packet storage 304. In another embodiment, the flow control channel can be another mechanism for communicating flow control information between the packet switch unit 302 and the packet storage 304. In one embodiment, the flow control channel is Ethernet based. If more than one queue on the packet storage unit 304 is associated with one queue on the packet switch unit 302, then the packet storage unit 304 can use scheduling and prioritization mechanisms to decide which packet to send to the packet switch unit 302. In one embodiment, the packet switch unit 302 uses a flow control channel to indicate to the packet storage unit 304 when the packet storage unit 304 should transmit a packet to the packet switch unit 302. The flow control channel ideally ensures that the packet switch unit 302 does not drop any packets. In one embodiment, the flow control information may be carried over a special dedicated connection from packet switch unit 302 and packet storage unit 304 (e.g., flow control 316) "out-of-band", or flow control information may be carried "in-band" using one or more of the m pin interfaces that connect packet switch unit 302 and packet storage unit 304.

In these embodiments, the packet switch unit 302 uses the flow control channel to indicate to the packet storage unit 304 that the packet storage unit 304 can send a packet that will not be dropped by the packet switch unit 302. In one embodiment, the flow control channel uses a stateful XON/XOFF protocol between packet switch unit 302 and packet storage unit 304. In this embodiment, the packet switch unit 302 sends an XON message for internal queue Q when packet switch unit 302's internal queue Q is below a "low watermark", and packet switch unit 302 sends an XOFF for internal queue Q when packet switch unit 302's internal queue Q is above a "high watermark." If the flow control channel is "in-band" for XON/XOFF messages supporting multiple queues, the XON/XOFF messages indicating the state of multiple queues can be sent in a single packet from packet storage unit 304 to packet switch unit 302 to improve efficiency and/or reduce latency of the flow control messages. In one embodiment, the flow control messages may be prioritized over regular traffic to ensure that they are delivered with minimal latency.

The flow control technique, in one embodiment, has two properties: (1) the XOFF message for internal queue Q on the packet switch unit 302 is to be processed by packet storage unit 304 before Q on packet switch unit 302 overflows (including any packets in flight from packet storage unit 304 to packet switch unit 302), and (II) the XON message for Q is to be processed by packet storage unit 304 before Q goes empty on packet switch unit 302. The former property ensures that no packets are sent by packet switch unit 302 that are then dropped on packet switch unit 302 due to congestion in the outgoing queues. The latter property ensures that the path from packet storage unit 304 to packet switch unit 302 allows for the queue on the packet switch unit 302 does not go empty if there are packets for this queue in the packet storage unit 304. In this embodiment, these properties determine when a XON or XOFF message is sent by the packet switch unit 302 to the packet storage unit 304 for a queue on the packet switch unit 302.

In one embodiment, the flow control information is "piggybacked" on regular packets sent from packet switch unit 302 to packet storage unit 304 by encoding the XON/XOFF state in additional headers appended by packet switch unit 302. For example and in one embodiment, consider a device with 16 EQ network interfaces operating at 100 gigabits per second, and 96 non-EQ network interfaces, and 8 queues per network interface. With 4 pin interfaces connecting packet switch unit 302 and packet storage unit 304, there are at least 33.333 million packets per second from packet switch unit 302 to packet storage unit 304, assuming 1500 byte packets, a common packet size in the Internet. If 72 bits are added to each packet to communicate the XON/XOFF flow control state for EQ interfaces 8-15, then the XON/XOFF state of all 8 queues of EQ interfaces 8-15 could be communicated in one packet header, encoded as follows.

```
(Byte) 0         1           2            3                  8
     | IID  | xoff-IID | xoff-IDD+1 | xoff-IID+2 | ... | xoff-IID+7 |

| 8    | 00001000 | 00000001   | 00000000   | ... | 1110001    |
``` where IID is the interface ID of the first XOFF information.

In another embodiment, there is a separate link dedicated to flow control (e.g., flow control 316 as illustrated in FIG. 3A). In one embodiment, this dedicated link carries the flow control in the body of continuously sent Ethernet packets. For example and in one embodiment and referring to the example described above with 100 externally visible ports and eight queues per port, each packet might contain 800 bits (100 bytes) of flow control status. With the dedicated link for flow control information that operates at the same speed as each of four packet switch unit 302-to-packet storage unit 304 links, a queue that crosses its high watermark and immediately sends an XOFF message at the next opportunity could receive additional packets corresponding to data in-flight from the packet storage unit 304 before an XOFF message was received and processed by packet storage unit 304. The potential number of additional packets determines the amount of buffering above the high watermark that packet switch unit 302 has in order to not drop traffic from packet storage unit 304.

In another embodiment, the flow control link need not operate at the same speed as the packet switch unit 302-to-packet storage unit 304 links. Furthermore, the flow control link need not use the same encapsulation format or link-layer encoding. In an Ethernet switch, however, it may be useful to communicate the flow control information over Ethernet in order to leverage the existing communication technology used on the other links.

In another embodiment, switch component 300 can operate without a dedicated flow control channel if the traffic from the packet storage unit 304 to the packet switch unit 302 for any interface I is shaped to an aggregate rate that is lower than the transmission rate of interface I on the packet switch unit 302. This embodiment may work well in the absence of "East-West" traffic between the non-EQ ports. If the aggregate rate of traffic from packet switch unit 302 to packet storage unit 304 is not exceeded, then the primary queuing for the non-EQ interfaces happens in packet storage unit 304 and the non-EQ interfaces will behave as in a large buffered switch.

In a further embodiment, a 802.3x flow control (commonly referred to as "PAUSE") or Priority Flow Control "PFC" can be enabled on the non-EQ externally-visible links to prevent them from overrunning their output buffers on the packet switch unit 302. This effectively pushes the buffering of packets received by those ports back to the neighboring devices, rather than consuming buffers on packet switch unit 302. In situations where the neighboring devices are end stations, this technique is especially effective, because end stations tend to be able to buffer large amounts of data. In one embodiment, this type of flow control is called an external flow control as the external flow control is used to control packet transmission between the packet switch unit or network element and one or more devices coupled to an external facing interface. In this embodiment, external flow control is different than the internal flow control described above that is used between the packet switch unit and packet storage unit. The external flow control is between the network element and one or more devices coupled to the network element.

Using flow control on the uplink ports (e.g., $I_1$ to $I_m$, EQ pin interfaces 310A), however, is not desirable because it "spreads" the congestion on the edge switch to the neighboring switch, which can result in head-of-line blocking (HOLB), which is an undesirable condition for a network element in a network. However, end station connected ports do not suffer from the HOLB problem, and so 802.3x flow control can be an effective solution for buffering of packets from directly-connected end stations.

In another embodiment, 802.3x link level, 802.1Qbb flow control mechanisms, 802.1Q-2011/802.1qau flow control or another type of flow control mechanism can be used manage a flow of packets between the packet switch unit 302 and packet storage unit 304. For example and in one embodiment, a limited number of uplink network interfaces on a network element use external queuing, while the remainder of the network interfaces are internally queued. For the internally queued network interfaces, the network element uses external flow control mechanisms such as 802.3x flow control or 802.1Qbb Priority Flow Control on them. These internally queued network interfaces use flow control across the network interface to get the device coupled on these interfaces to stop sending us traffic when the internal queues or buffers are filling up. Using flow control to push the buffering back into this device (e.g., and end station) is generally fine. However, using flow control on uplinks into a network can have bad side effects relating to spreading congestion into the rest of the network. For the uplinks, the network element can use the external queues, which do not suffer from these side effects.

Figure 3B:
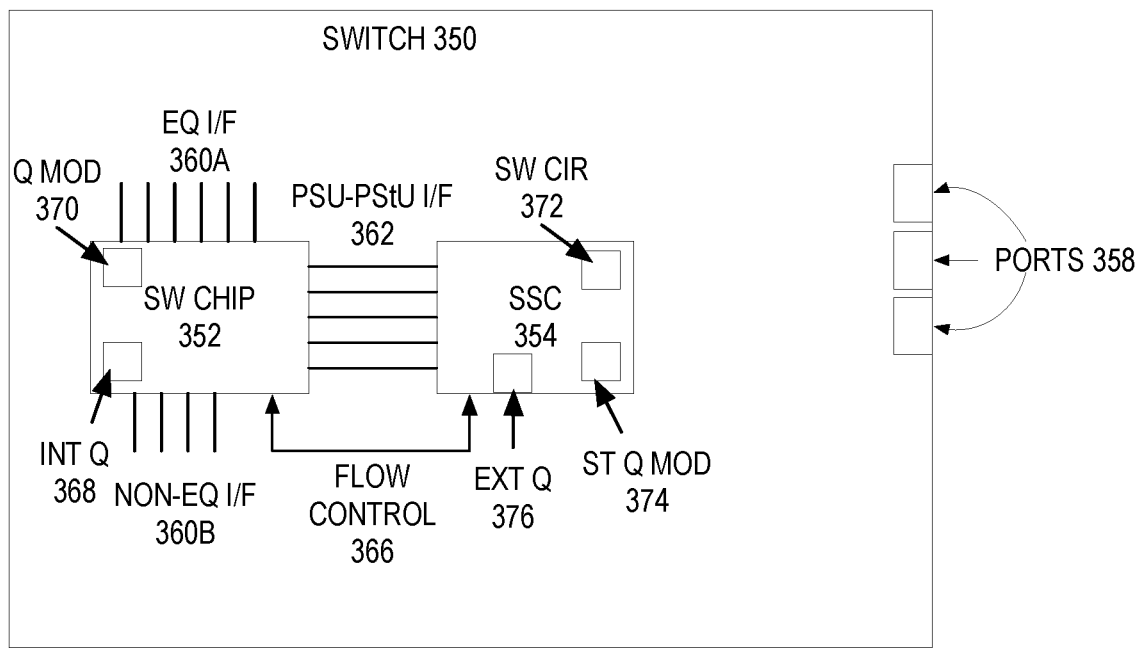
FIG. 3B is a block diagram of one embodiment of a switch component that includes a packet switch unit and packet storage unit.

FIG. 3B is a block diagram of one embodiment of a switch component 350 that includes a packet switch unit and packet storage unit. In FIG. 3B, the switch component 350 includes the packet switch unit 352 coupled to the packet storage unit 354 via the packet switch unit-packet storage unit interfaces 362. In one embodiment, the switch component 350 is similar to switch component 300 of FIG. 3A, except that the external queues 376 are on the packet storage unit 354 instead in the memory chip. In one embodiment, the packet switch unit 352 includes n pin interfaces that couple the packet switch unit 352 to ports 358 (EQ interfaces 360A and non-EQ interfaces 360B) and the packet storage unit 354 (PSU-PStU interface 362). The packet switch unit 352 further includes internal queues 368 that are used to queue packets prior to the packets being forwarded to a network interface and a queue module 370 manages the decision to store the packet in an internal or external queue. In one embodiment, the packet storage unit 354 includes switch circuitry 372 to process the packet and storage queue module 374 to manage the de-queuing of externally stored packets stored in an external queue.

Figure 4:
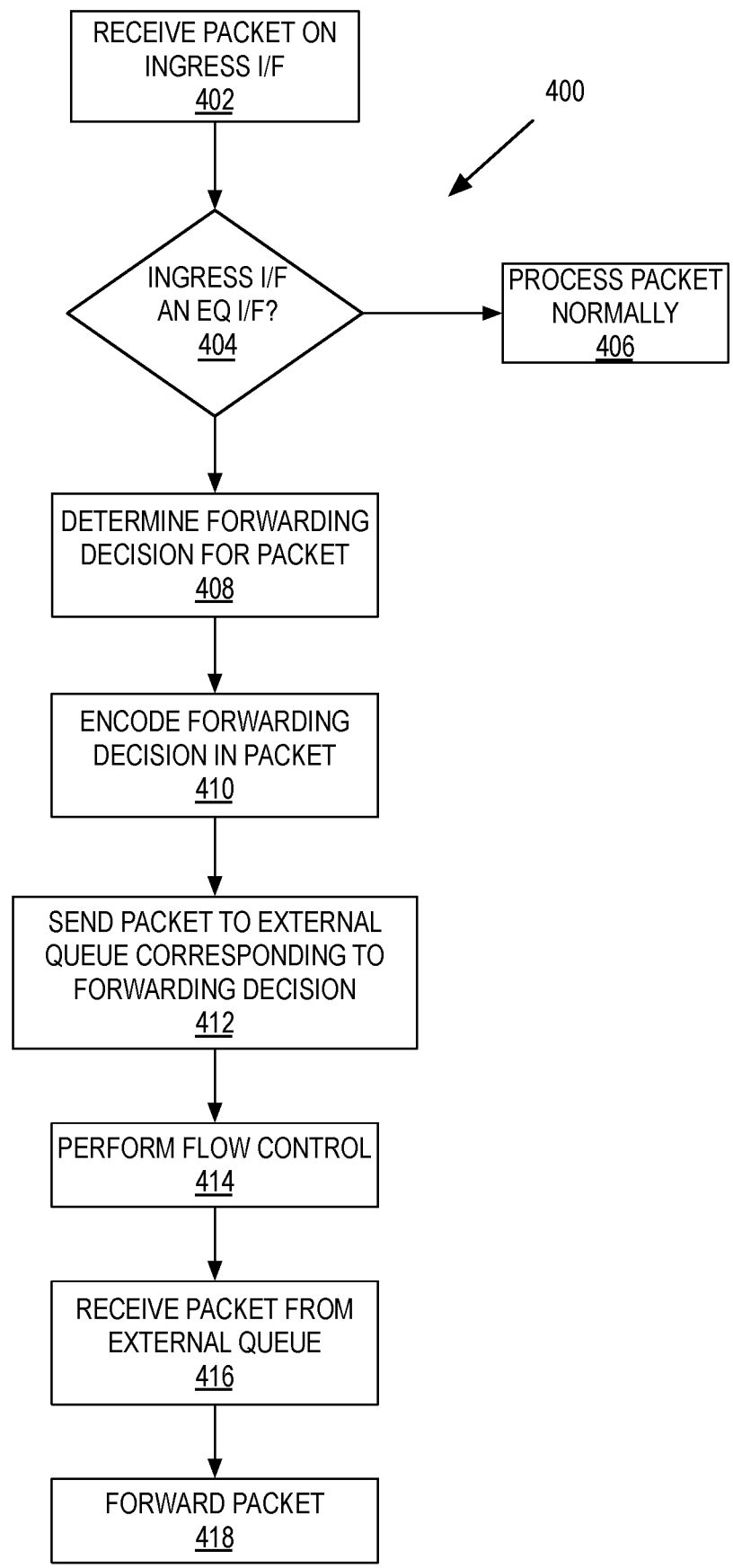
FIG. 4 is an illustration of one embodiment of a process to queue a packet using a packet storage unit.

FIG. 4 is an illustration of one embodiment of a process 400 to queue a packet using a packet storage unit. In one embodiment, process 400 is performed by a queue module to queue a packet using a packet storage unit, such as the queue module 320 as illustrated in FIG. 3A or queue module 370 as illustrated in FIG. 3B. In FIG. 4, process 400 begins by receiving a packet on an ingress interface at block 402. In one embodiment, the packet can be layer 2 packet, layer 3 packet, or another type of packet used to communicate data across a network. For example and in one embodiment, the packet includes a header and a payload, where the header includes source and destination addresses. In one embodiment, the ingress interface is the network interface used by the network element to receive the packet from the network. At block 404, process 400 determines if the ingress interface is associated with an EQ pin interface. In one embodiment, an EQ pin interface is an interface that has been configured to have packets received from this interface to be queued in an external queue before these packets are transmitted via an egress interface. In one embodiment, process 400 determines if the ingress interface is an EQ pin interface by determining whether the ingress interface has been configured to be an EQ pin interface. In this embodiment, a network element may have some interfaces configured as EQ interface(s) (e.g., EQ interfaces 310A) and other interfaces as internal queuing interface(s) (e.g., non-EQ interfaces 310B). For example and in one embodiment, interfaces that couple to high-bandwidth sources or sources that are network services that are sensitive to dropped packets (e.g., a video server, data storage traffic (e.g., Internet Small Computer System Interface (iSCSI) or Fibre Channel over Ethernet (FCoE) packets) may be configured as EQ pin interfaces. Alternatively, an EQ pin interface can be configured for high speed uplinks. For example and in one embodiment, high speed uplinks into the rest of the network, that have to rate convert to lower speed links connected to end stations, are especially appropriate for EQ pin interfaces. For example, if the data comes in on the uplink at 100 Gbps but goes to the server at 10 Gbps, the network element have to buffer the traffic to allow for the rate conversion. If the ingress interface is not an external queuing interface, at block 406, process 400 processes the packet normally.

In one embodiment, process 400 uses the external queuing designation for the ingress interface so as to determine which of the packets process 400 is processing are to be externally queued. In another embodiment, process 400 may use a different determination as to whether to externally queue the packets. For example and in one embodiment, process 400 may determine a packet is to be externally queued based on the packet characteristics of that packet. In this example, packets with certain source and/or destination addresses and ports may be externally queued. Thus a flow of packets with similar characteristics may be externally queued, whereas a different flow of packets may be internally queued. In another embodiment, quality of service (QoS) indications in the packet, such as the class of service (COS) field of an 802.1q header or the differentiated services code point (DSCP) field of an IPv4 packet or the traffic class of an IPv6 packet, could be used to determine whether to externally buffer or not. In this embodiment, certain classes could be externally queued while others are not, allowing low latency traffic to avoid the extra queuing while traffic that is less latency sensitive but more drop sensitive can benefit from the external queuing. In a further embodiment, the depth of the internal queue for the egress interface could be used to decide to externally queue a packet. When the internal queue gets beyond a given depth the network element could choose to start externally queuing packets destined there.

If the packet was received on an ingress interface that is not an externally queuing interface, at block 406, process 400 processes the packet normally. In one embodiment, process 400 processes the packet by queuing this packet in a queue that is internal to the packet switch unit that is processing the packet. If the ingress interface is an externally queuing interface, process 400 determines the forwarding decisions for that packet at block 408. In one embodiment, the forwarding decisions for that packet are which egress interface is used to transmit that packet. For example in one embodiment, if the packet has an associated route or the packet is to be transmitted towards a specific attached network element, then the forwarding decision is to forward that packet to the egress interface for that specific network element.

At block 410, process 400 encodes a forwarding decision in the packet. In one embodiment, process 400 encodes the forwarding decision in the packet header. For example and in one embodiment, process 400 can encode the forwarding decision in a special-purpose packet header, an 802.1Q VLAN tag, an MPLS header, and/or a combination thereof. Alternatively, process 400 can leave the forwarding decision to the packet storage unit, which determines the actual destination port and queue for that packet. For example and in one embodiment, process 400 can encode the forwarding decision as described in FIG. 3A above. Process 400 sends the packet to the external queue corresponding to the to the forwarding decision at block 412. In one embodiment, process 400 sends the packet to the packet storage unit, which then stores the packet in an external queue corresponding to the forwarding decision for that packet.

At block 414, process 400 performs flow control for the queue that corresponds to this packet. In one embodiment, the flow control is used to ensure that there is space in the internal queue for this packet. In this embodiment, a packet, destined for an egress interface and queue Q, remains queued in the internal queue until a flow control channel from the packet switch unit to the packet storage unit indicates to the packet storage unit that the switch chip has room for a packet to egress interface and internal queue Q. In other words, the flow control channel is used by the packet switch unit to indicate to the packet storage unit when the packet storage unit should transmit a packet for that queue. In one embodiment, the flow control channel is used to ensure that no externally queued packets are dropped by the packet switch unit. In one embodiment, process 400 performs the flow control as described in FIG. 3A above. The flow control performed by process 400 is further described in FIG. 5 below.

Process 400 receives a packet from the external queue at block 416. In one embodiment, process 400 stores this packet in an internal queue prior to this packet being forwarded to the egress interface for transmission. At block 418, process 400 forwards this packet to the egress interface for transmission. In one embodiment, process 400 forwards this packet when a packet scheduler indicates that this packet should be transmitted.

Figure 5:
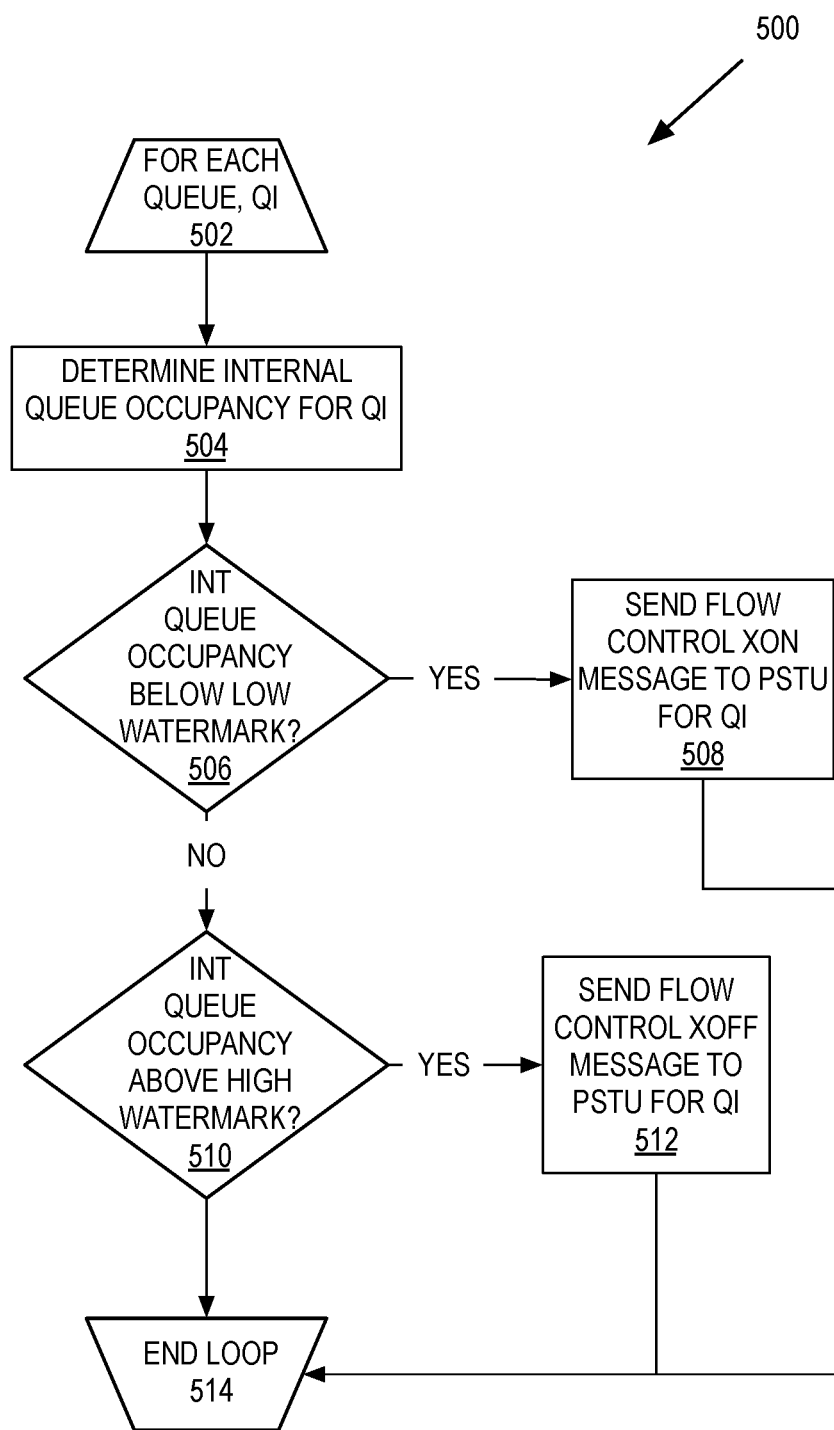
FIG. 5 is a flow diagram of one embodiment of a process to perform flow control between a packet switch unit and a packet storage unit.

As described above, the flow control channel is used by the packet switch unit to indicate to packet storage unit when the packet storage unit should transmit a packet for a particular internal queue on the packet switch unit. FIG. 5 is a flow diagram of one embodiment of a process 500 to perform flow control between a packet switch unit and a packet storage unit. In one embodiment, process 500 is performed by a queue module to perform flow control between a packet switch unit and a packet storage unit, such as the queue module 320 as illustrated in FIG. 3A or queue module 370 as illustrated in FIG. 3B. In FIG. 5, process 500 begins by performing a processing loop for each internal queue, $Q_i$, (blocks 502-514 to perform the flow control for each queue in the switch component of a network element. At block 504, process 500 determines the queue occupancy for the internal queue, $Q_i$. In one embodiment, the queue occupancy for this queue should be between a low watermark and a high watermark, such that packets stored in the external queue can be stored in the internal queue without being dropped (for lack of space in the queue) and that there are packets in the internal queue, $Q_i$ that are available to be forwarded for transmission. In one embodiment, process 500 determines the queue occupancy for $Q_i$ by reading the queue depth value that is stored on the network element.

At block 506, process 500 determines if the internal queue occupancy for internal queue $Q_i$ is below a low watermark. In one embodiment, the low watermark is set to a value such that the packet storage unit processes the flow control XON message before $Q_i$ goes empty. If the queue occupancy of $Q_i$ is below the low watermark, process 500 sends a flow control XON message to the packet storage unit for $Q_I$ at block 508. In one embodiment, the XON flow control message indicates that the packet storage unit should start sending packets for $Q_i$. Execution proceeds to block 514 below.

At block 510, process 500 determines if the external queue occupancy for external queue $Q_i$ is above a high watermark. In one embodiment, the high watermark for the queue is set low enough so that the internal queue $Q_i$ has space for additional packets. For example and in one embodiment, the high watermark is set to a value such that the packet storage unit processes the flow control XON message before $Q_i$ overfills. If the queue occupancy of $Q_i$ is up the high watermark, process 500 sends a flow control XOFF message to the packet storage unit for $Q_I$ at block 512. In one embodiment, the XOFF flow control message indicates that the packet storage unit should stop sending packets for $Q_i$. Execution proceeds to block 514 below. The processing loop ends at block 514.

Figure 6A:
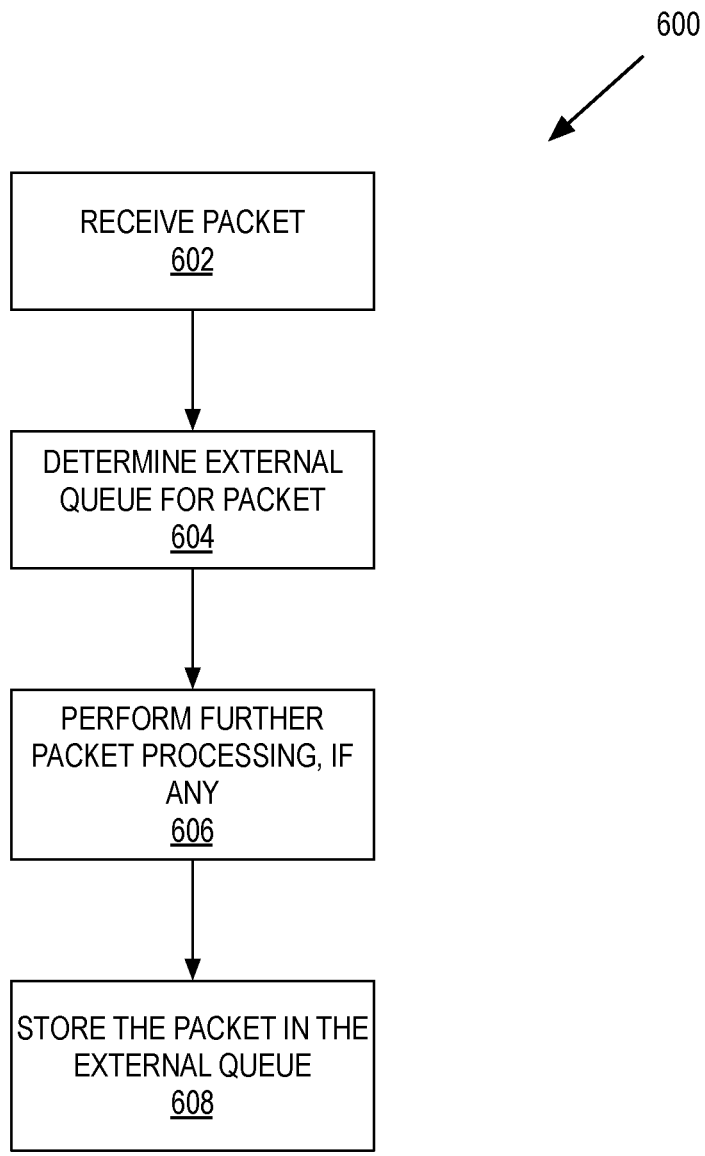
FIG. 6A is a flow diagram of one embodiment of a process to store a packet in a packet storage unit.

FIG. 6A is a flow diagram of one embodiment of a process 600 to process a packet with a packet storage unit. In one embodiment, process 600 is performed by a storage queue module to process a packet within a packet storage unit, such as the storage queue module 324 as illustrated in FIG. 3A or storage queue module 374 as illustrated in FIG. 3B. In FIG. 6A, process 600 begins by receiving a packet at block 602. In one embodiment, process 600 receives the packet from the packet switch unit over an interface that corresponds to the external queue for this packet. At block 604, process 600 determines an external queue for this packet. In one embodiment, process 600 determines the external queue for the packet based on an encoded forwarding decision included in the packet. For example and in one embodiment, which external queue to use can be encoded in a special purpose packet header, an 802.1q VLAN tag, MPLS header, or a combination thereof. In another embodiment, process 600 determines the external queue by examining the packet characteristics and assigning the external queue. In this embodiment, process 600 makes the queuing decision for the packet instead of the packet switch unit.

At block 606, process 600 performs further packet processing. In one embodiment, the packet processing responsibilities for each packet can be either performed by the packet switch unit, the packet storage unit, or both of these chips. For example and in one embodiment, the different types of packet processing can be input filtering, forwarding decisions, queuing decision, egress filtering, rate limiting, classifying, QOS marking, tunnel encapsulating, tunnel decapsulating, and network address translation (NAT) rewriting. In this example, the input filtering is applying access control lists to the packet, forwarding decision is determining the egress interface used to transmit the packet, and the queuing decision is determining which queue the packet will use. In another example, the packet switch unit can perform the input filtering and the forwarding decision and the packet storage unit can perform the queuing decision. In one embodiment, by splitting the responsibilities between the two different chips, neither chip needs additional expensive processing capabilities. At block 608, process 600 stores the packet in the external queue. In one embodiment, process 600 sends the packet to a memory chip to be stored in the corresponding external queue on the memory chip. In another embodiment, process 600 stores the packet in an external queue on the packet storage unit.

Figure 6B:
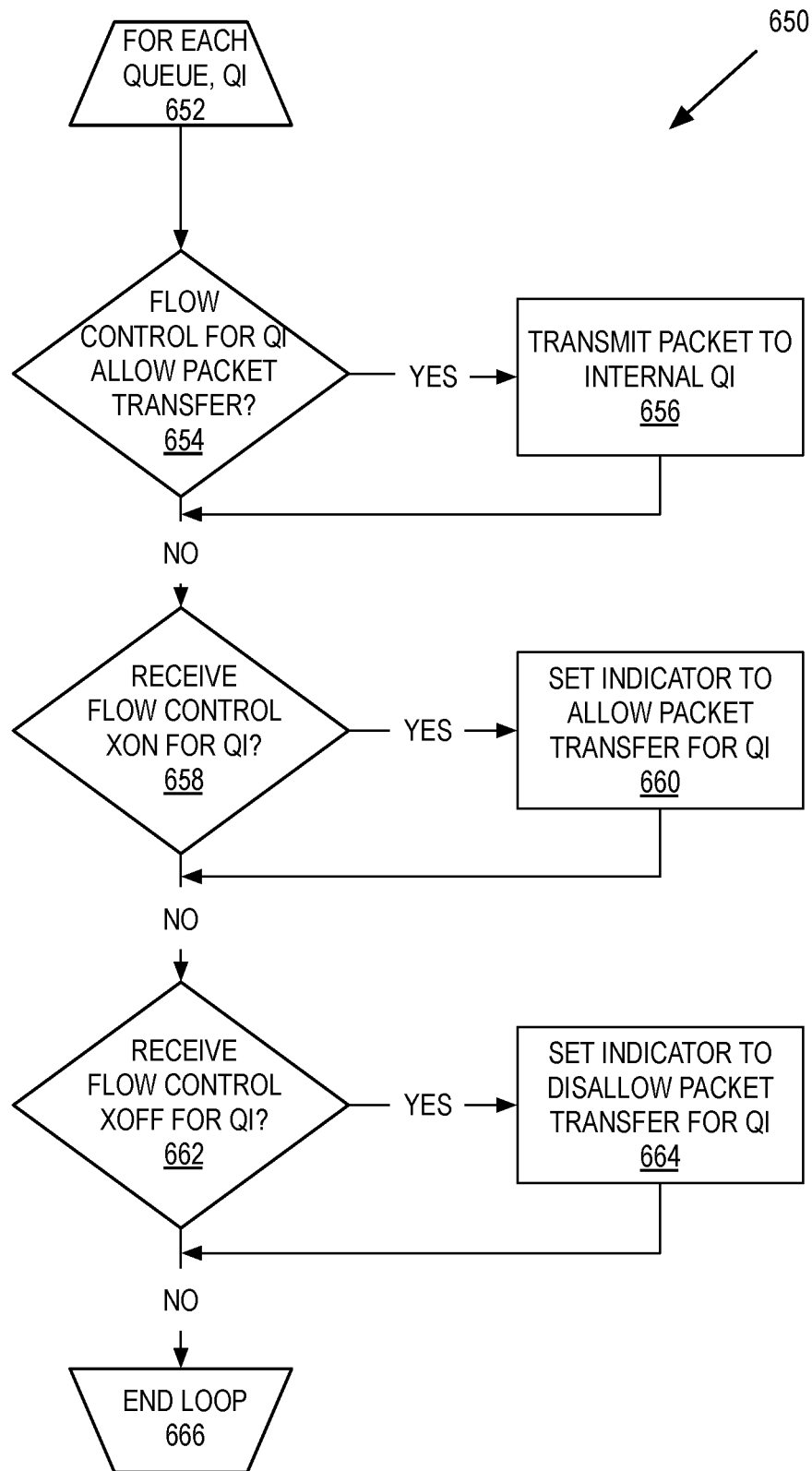
FIG. 6B is a flow diagram of one embodiment of a process to de-queue a packet from a packet storage unit.

FIG. 6B is a flow diagram of one embodiment of a process 650 to de-queue a packet from a packet storage unit. In one embodiment, process 650 is performed by a storage queue module to de-queue a packet from a packet storage unit, such as the storage queue module 324 as illustrated in FIG. 3A or storage queue module 374 as illustrated in FIG. 3B. In FIG. 6B, process 650 begins by performing a processing loop (blocks 652-666) to de-queue a packet. At block 654, process 650 determines if the flow control for external queue $Q_i$ allows for a packet transfer to a corresponding internal queue. In one embodiment, process 650 determines an allowable packet transfer if the last flow control message for external $Q_i$ was an XON message indicating the packets from the external queue Q should be sent to the corresponding internal queue. If the flow control allows for packet transfer, at block 656, process 650 transmits the packet to the corresponding internal queue. In one embodiment, process 650 transmits this packet using the interface for this queue coupling the packet switch unit and the packet storage unit. In another embodiment, process 650 performs queue shaping and/or queue scheduling to determine which packet is transmitted to the packet switch unit. In this embodiment, there may be multiple external queues that are associated with the internal queue and process 650 can use queue shaping and/or queue scheduling to determine which packet from which of the external queues should be transmitted. Execution proceeds to block 658 below. If the flow control does not allow for packet transfer for $Q_i$ execution proceeds to block 658 below.

At block 658, process 650 determines if this process has received a flow control XON message for external queue $Q_i$. If process 650 has received the XON flow control message, process 650 sets an indicator to allow packet transfers for $Q_i$. Execution proceeds to block 662 below. If the XON flow control message has not been received, execution proceeds to block 662 below. Process 650 determines if this process has received a flow control XOFF message for external queue $Q_i$ at block 662. If process 650 has received the XOFF flow control message, process 650 sets an indicator to disallow packet transfers for $Q_i$. Execution proceeds to block 666 below. If the XOFF flow control message has not been received, execution proceeds to block 666 below. The processing loop ends at block 666.

Figure 7:
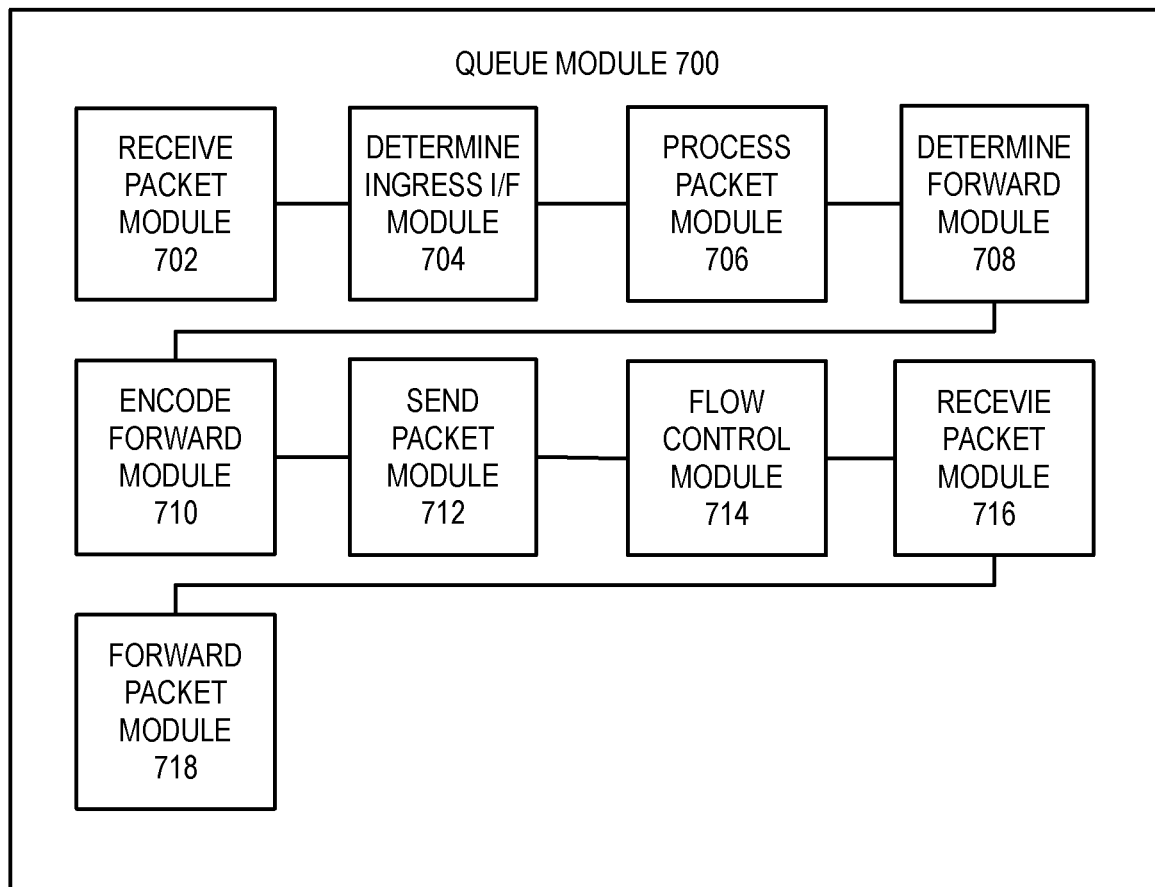
FIG. 7 is a block diagram of one embodiment of a queue module that queues a packet using a packet storage unit.

FIG. 7 is a block diagram of one embodiment of a queue module 700 that queues a packet using a switching storage chip. In one embodiment, the queue module 700 is the queue module 320 as described in FIG. 3A or queue module 370 as described in FIG. 3B. In one embodiment, the queue module 700 includes a receive packet module 702, determine ingress interface 704, process packet module 706, determine forwarding module 708, encode forwarding module 710, send packet module 712, flow control module 714, receive packet module 716, and forward packet module 718. In one embodiment, the receive packet module 702 receives a packet as described in FIG. 4, block 402 above. The determine ingress interface 704 determines if the ingress interface for the received packet is an external queuing interface as described in FIG. 4, block 404 above. The process packet module 706 processes the packet normally as described in FIG. 4, block 406 above. The determine forwarding module 708 determines the forwarding decision for the packet as described in FIG. 4, block 408 above. The encode forwarding module 710 encodes the forwarding decision as described in FIG. 4, block 410 above. The send packet module 712 sends the packet to the packet storage unit as described in FIG. 4, block 412 above. The flow control module 714 performs flow control as described in FIG. 4, block 414 above. The receive packet module 716 receives the packet from the packet storage unit as described in FIG. 4, block 416 above. The forward packet module 718 forwards the packet to the egress interface as described in FIG. 4, block 418 above.

Figure 8:
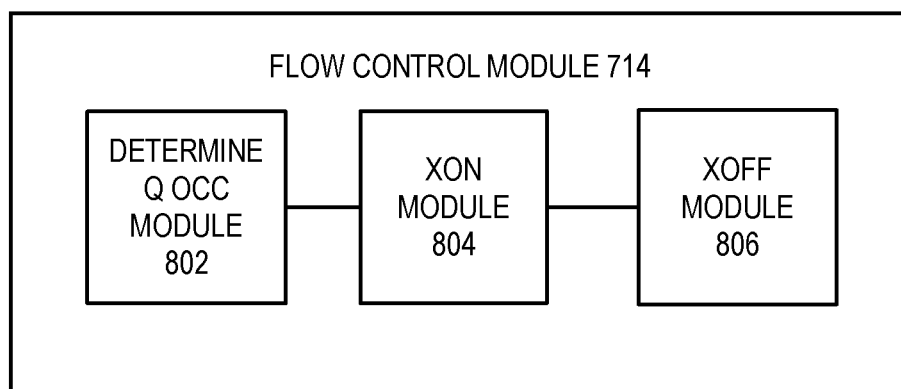
FIG. 8 is a block diagram of one embodiment of a flow control module that performs flow control between a packet switch unit and a packet storage unit.

FIG. 8 is a block diagram of one embodiment of a flow control module 714 that performs flow control between a packet switch unit and a packet storage unit. In one embodiment, the flow control module 714 includes a determine queue occupancy module 802, XON module 804, and XOFF module 806. In one embodiment, the determine queue occupancy module 802 determines the queue occupancy for a queue as described in FIG. 5, block 504 above. The XON module 804 determines if the queue occupancy is below a low watermark and sends an XON message as described in FIG. 5, blocks 506 and 508 above. The XOFF module 806 determines if the queue occupancy is above a high watermark and sends an XOFF message as described in FIG. 5, blocks 510 and 512 above.

Figure 9:
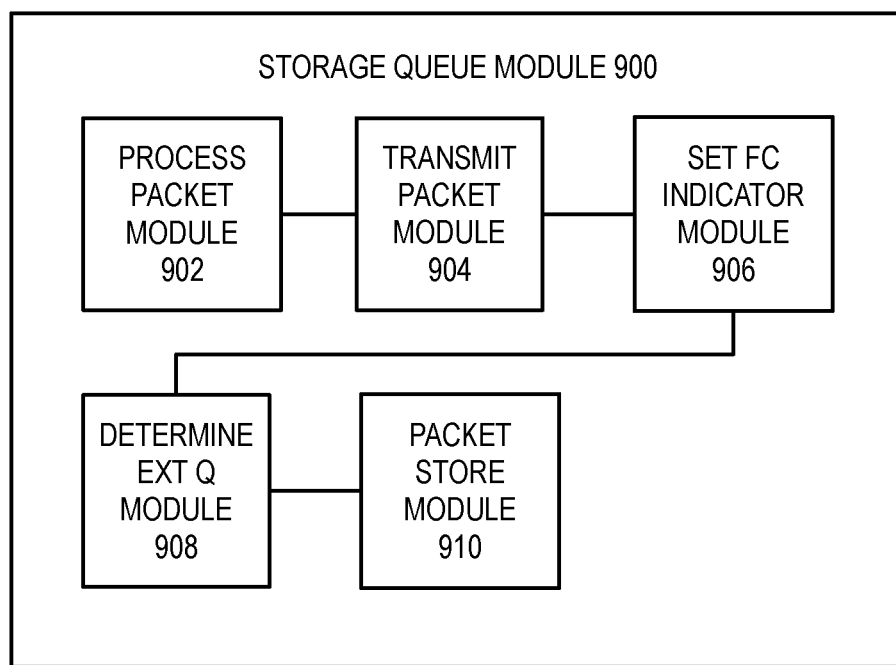
FIG. 9 is a block diagram of one embodiment of a storage queue module that de-queues a packet from a packet storage unit.

FIG. 9 is a block diagram of one embodiment of a storage queue module 900 that process a packet in a packet storage unit. In one embodiment, the storage queue module 900 is the storage queue module 324 as described in FIG. 3A or storage queue module 374 as described in FIG. 3B. In one embodiment, the storage queue module 900 includes process packet module 902, transmit packet module 904, set flow control indicator module 906, determine external queue module 908, and packet store module 910. In one embodiment, the process packet module 902 process the packet as described in FIG. 6A, block 606 above. The transmit packet module 904 transmits the packet to the packet switch unit as described in FIG. 6B, block 656 above. The set flow control indicator module 906 sets the flow control indicator as described in FIG. 6A, blocks 660 and 664 above. The determine external queue module 908 determines the external queue for a packet as described in FIG. 6A, block 604 above. The packet store module 910 stores the packet in the external queue as described in FIG. 6A, block 610 above.

Figure 10:
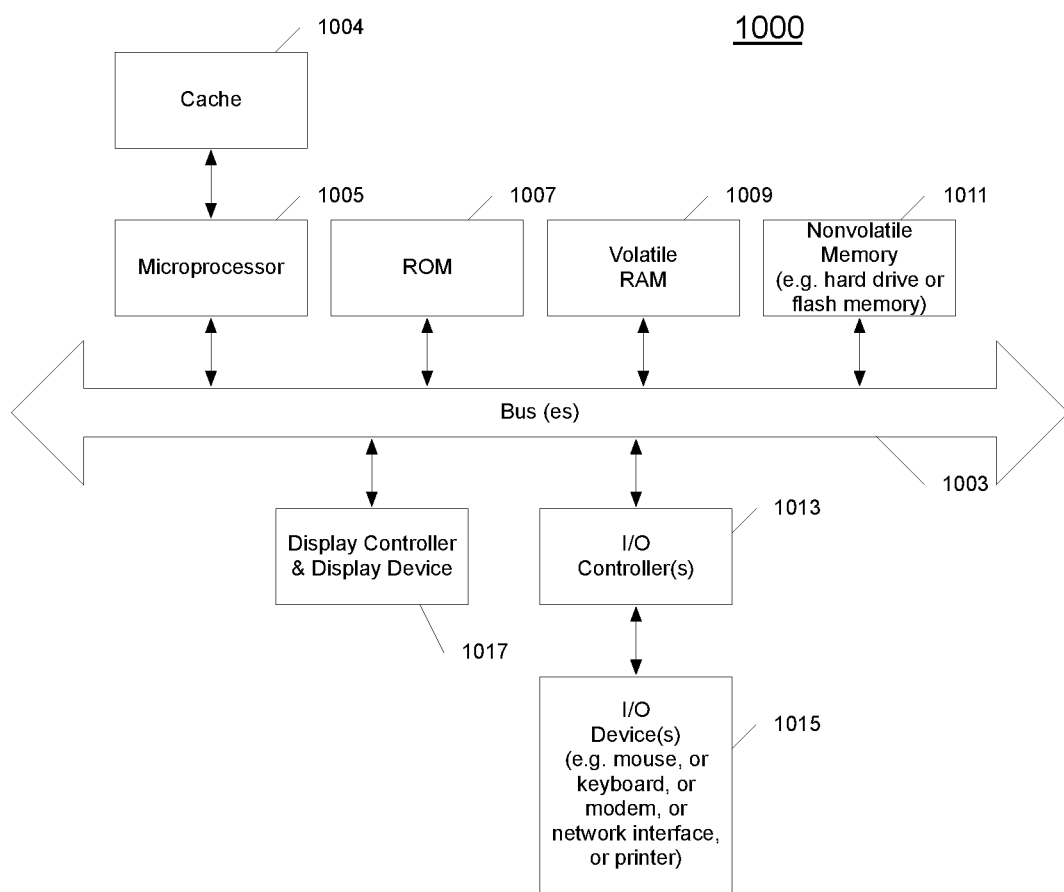
FIG. 10 illustrates one example of a typical computer system, which may be used in conjunction with the embodiments described herein.

FIG. 10 shows one example of a data processing system 1000, which may be used with one embodiment of the present invention. For example, the system 1000 may be implemented including a network element 102 as shown in FIG. 1. Note that while FIG. 10 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 10, the computer system 1000, which is a form of a data processing system, includes a bus 1003 which is coupled to a microprocessor(s) 1005 and a ROM (Read Only Memory) 1007 and volatile RAM 1009 and a non-volatile memory 1011. The microprocessor 1005 may retrieve the instructions from the memories 1007, 1009, 1011 and execute the instructions to perform operations described above. The bus 1003 interconnects these various components together and also interconnects these components 1005, 1007, 1009, and 1011 to a display controller and display device 1017 and to peripheral devices such as input/output (I/O) devices which may be mice, keyboards, modems, network interfaces, printers and other devices which are well known in the art. In one embodiment, the system 1000 includes a plurality of network interfaces of the same or different type (e.g., Ethernet copper interface, Ethernet fiber interfaces, wireless, and/or other types of network interfaces). In this embodiment, the system 1000 can include a forwarding engine to forward network date received on one interface out another interface.

Typically, the input/output devices 1015 are coupled to the system through input/output controllers 1013. The volatile RAM (Random Access Memory) 1009 is typically implemented as dynamic RAM (DRAM), which requires power continually in order to refresh or maintain the data in the memory.

The mass storage 1011 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 1011 will also be a random access memory although this is not required. While FIG. 10 shows that the mass storage 1011 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1003 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 11:
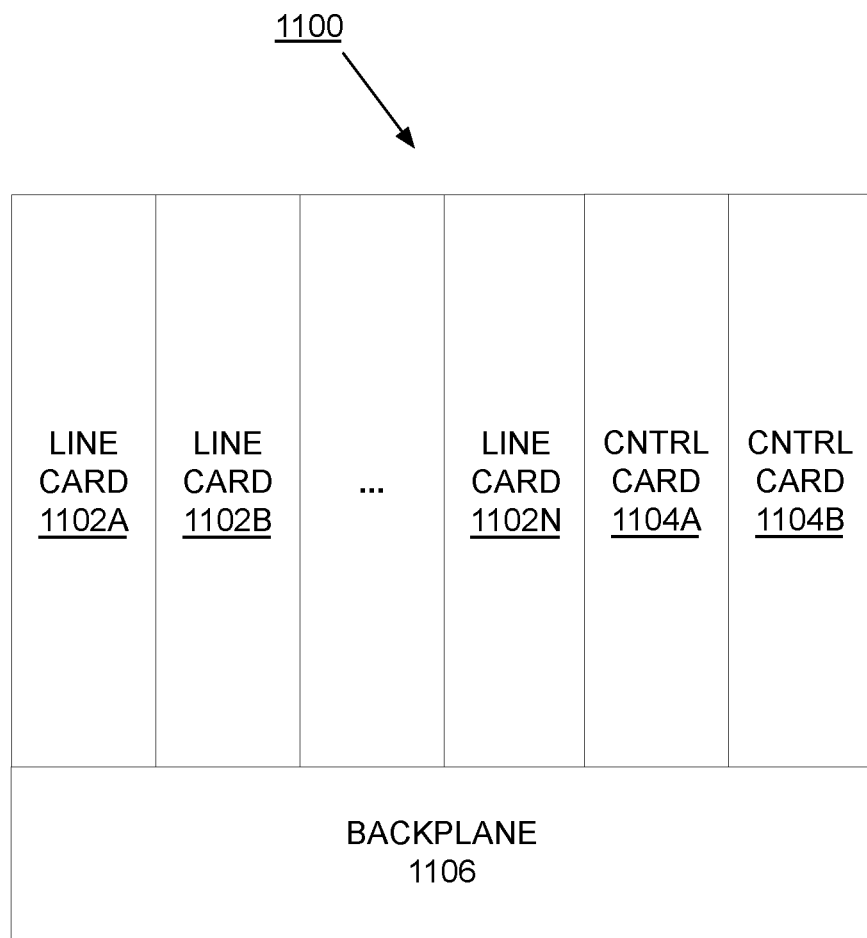
FIG. 11 is a block diagram of one embodiment of an exemplary network element that queues a packet using a packet storage unit.

FIG. 11 is a block diagram of one embodiment of an exemplary network element 1100 that queues a packet using a packet storage unit. In FIG. 11, the backplane 1106 couples to the line cards 1102A-N and controller cards 1104A-B. While in one embodiment, the controller cards 1104A-B control the processing of the traffic by the line cards 1102A-N, in alternate embodiments, the controller cards 1104A-B, perform the same and/or different functions. In one embodiment, the line cards 1102A-N process and forward traffic according to the network policies received from controller cards the 1104A-B. In one embodiment, one of the line cards 1102A-N queues a packet using a packet storage unit as described in FIGS. 2-6B. In this embodiment, one, some, or all of the line cards 1102A-N includes the switch component to queue a packet using a packet storage unit, such as the switch component 300 in FIG. 3A or switch component 350 as described in FIG. 3B above. It should be understood that the architecture of the network element 1100 illustrated in FIG. 11 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "identifying," "determining," "performing," "forwarding," "storing," "identifying," "updating," "processing," "sending," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to process a packet in a network element, the method comprising:
   receiving the packet, with a packet switch unit, wherein the packet was received by the network element on an ingress interface, each ingress interface being one of an externally queued (EQ) interface and a non-EQ interface;
   determining whether the packet is to be stored in one of a plurality of external queues of a packet storage unit based on at least whether the ingress interface that received the packet is an EQ interface, wherein the packet storage unit is external to and coupled to the packet switch unit;
   determining whether the packet is to be stored in one of a plurality of internal queues of the packet switch unit based on at least the ingress interface that received the packet being a non-EQ interface;
   if the packet is to be stored in one of the plurality of external queues,
      selecting, from among the plurality of external queues, one of the plurality of external queues for the packet based on forwarding information of the packet,
      forwarding the packet to the packet storage unit, wherein the packet storage unit includes storage for the external queue,
      receiving, with the packet switch unit, the packet from the packet storage unit, and
      forwarding the packet to an egress interface corresponding to the selected one of the plurality of external queues, and
   if the packet is to be stored in one of the plurality of internal queues, storing the packet in one of the plurality of internal queues.

2. The machine-readable medium of claim 1, wherein the determining whether the packet is to be stored in an external queue comprises:
   determining if the ingress interface is designated as an external queue interface.

3. The machine-readable medium of claim 1, wherein the forwarding of the packet to the egress interface comprises:
   transmitting the packet to a pin interface of the packet switch unit that corresponds to the egress interface.

4. The machine-readable medium of claim 1, further comprising:
   processing the packet.

5. The machine-readable medium of claim 4, wherein the processing of the packet comprises:
   processing the packet using one or more of functions selected from the group consisting of input filtering, forwarding decisions, queuing decisions, egress filtering, rate limiting, classifying, QOS marking, tunnel encapsulating, tunnel decapsulating, and network address translation (NAT) rewriting.

6. The machine-readable medium of claim 5, wherein some of the packet processing is performed by the packet switch unit and some of the packet processing is performed by the packet storage unit.

7. The machine-readable medium of claim 1, wherein the receiving of the packet comprises:
   storing the packet in a local queue on the packet switch unit prior to the forwarding of the packet to an egress interface.

8. The machine-readable medium of claim 7, wherein the method further comprises:
   communicating flow control information to the packet storage unit that indicates a packet may be sent to the packet switch unit from the external queue.

9. The machine-readable medium of claim 8, wherein the flow control information is internal flow control information that is communicated between the packet storage unit and the packet switch unit.

10. The machine-readable medium of claim 8, wherein the flow control information indicates to that multiple external queues can send packets to the packet switch unit.

11. The machine-readable medium of claim 10, wherein which of the multiple external queues is to send the packets depends on quality of service information associated with each of the multiple external queues.

12. The machine-readable medium of claim 7, wherein the method further comprises:
   communicating flow control information to the packet storage unit that indicates a packet may not be sent to the packet switch unit from the external queue.

13. The machine-readable medium of claim 1, wherein the method further comprises:
   determining if the packet is to be stored in an internal queue on the packet switch unit; and
   storing the packet in the internal queue.

14. The machine-readable medium of claim 13, wherein the determining is based on whether the ingress interface for the packet is designated as a non-external queued interface.

15. The machine-readable medium of claim 14, wherein the method further comprises:
enabling external flow control on an interface if this interface is designated as a non-external queued interface.

16. A non-transitory machine-readable medium having executable instructions to cause one or more processing units to perform a method to queue a packet in a network element, the method comprising:
receiving, with a packet storage unit, a packet from a packet switch unit via an interface coupling the packet storage unit and the packet switch unit, wherein the packet was received by the network element on a first network interface designated as an externally-queued interface
receiving, with the packet storage unit, a packet from the packet switch unit via an interface coupling the packet storage unit and the packet switch unit, wherein the packet was received by the network element on a second network interface designated as a non-externally-queued interface;
determining whether the received packet is to be stored in one of a plurality of external queues based on at least whether the network interface that received the packet is designated as an externally-queued interface or as a non-externally queued interface;
if the packet was received on the first network interface, determining an external queue among a plurality of external queues for the packet and storing the packet in the determined external queue, wherein the plurality of external queues is associated with the packet storage unit;
if the packet was received on the second network interface, determining an internal queue among a plurality of internal queues for the packet and storing the packet in the determined internal queue, wherein the plurality internal queues is associated with the packet switch unit; and
in response to detecting flow control information indicating packets may be sent from the determined external queue to the packet switch unit, forwarding the packet from the determined external queue to the packet switch unit.

17. The machine-readable medium of claim 16, wherein the packet switch unit forwards the packet to an egress interface for transmission.

18. The machine-readable medium of claim 16, wherein the packet storage unit is coupled to memory and the memory includes the external queue.

19. The machine-readable medium of claim 16, wherein this packet storage unit includes memory and the memory includes the external queue.

20. The machine-readable medium of claim 16, wherein the packet storage unit includes a plurality of external queues and there is an interface corresponding to each of the plurality of external queues coupling the packet storage unit and the packet switch unit.

21. A method to process a packet in a network element, the method comprising:
receiving the packet, by a packet switch unit, wherein the packet was received by the network element on one of a plurality of ingress interfaces, wherein at least some of the plurality of ingress interfaces are externally queued (EQ) interfaces, each EQ interface configured to have any packets received on the EQ interface queued in an external queue before being transmitted over an egress interface;
determining whether the packet is to be stored in one of a plurality of external queues of a packet storage unit based on at least whether the one of the plurality of ingress interfaces that received the packet is an EQ interface, wherein the packet storage unit is external and coupled to the packet switch unit;
if the packet is determined to be stored in one of the plurality of external queues,
selecting from among the plurality of external queues, one of the plurality of external queues for the packet based on forwarding information of the packet,
forwarding the packet to the packet storage unit, wherein the packet storage unit includes storage for the selected one of the plurality of external queues,
receiving, with the packet switch unit, the stored selected packet from the packet storage unit, and
forwarding the packet to an egress interface corresponding to the selected one of the plurality of external queues; and
if the packet is determined not to be stored in one of the plurality of external queues, storing the packet in one of a plurality of internal queues.

22. The method of claim 21, wherein the determining if the packet is to be stored in an external queue comprises:
determining if the ingress interface is designated as an external queue interface.

23. The method of claim 21, further comprising:
processing the packet using one or more of functions selected from the group consisting of input filtering, forwarding decisions, queuing decisions, egress filtering, rate limiting, classifying, QOS marking, tunnel encapsulating, tunnel decapsulating, and network address translation (NAT) rewriting.

24. The method of claim 23, wherein some of the packet processing is performed by the packet switch unit and some of the packet processing is performed by the packet storage unit.

25. The method of claim 21, further comprising:
communicating flow control information to the packet storage unit that indicates a packet may be sent to the packet switch unit from the external queue.

26. A network element that processes a plurality of packets, the network element comprising:
a plurality of network interfaces that communicate the plurality of packets, the plurality of network interfaces including a plurality of egress interfaces and a plurality of ingress interfaces, each of the plurality of ingress interfaces designated as one of an externally-queued interface and a non-externally-queued interface;
a data plane, coupled to the plurality of network interfaces, that process the plurality of packets and the data plane including:
a plurality of external queues that stores at least one of the plurality of packets prior to the at least one of the plurality of packets being transmitted by the network element;
a packet storage unit, coupled to the plurality of external queues, that controls the storing of the at least one of the plurality of packets in the plurality of external queues; and
a packet switch unit, external to and coupled to the packet storage unit, and including a plurality of internal queues, the packet switch unit, for each of the plurality of packets, receives the packet from a first network interface of the plurality of ingress interfaces, determines whether the packet is to be stored in one of the plurality of external queues based on at least the designation of the ingress interface that received the packet as an externally-queued interface, and if the packet is to be stored in one of the plurality of external queues, identifies which of one of the plurality of external queues for the packet based on forwarding information of the packet, and wherein the packet switch unit forwards the packet to the packet storage unit for storage in a corresponding one of the plurality of external queues, receives the packet from the packet storage unit; and forwards the packet to one of the plurality of egress interfaces of the plurality of network interfaces, and if the ingress interface that receives the packet is designated as an internally-queued interface, the packet switch unit stores the packet in one of the plurality of internal queues.

27. The network element of claim 26, wherein each of the packet switch unit and packet storage unit are selected from the group consisting of a separate general-purpose packet switching chip and a separate multi-component general-purpose packet switching module.

28. A network element that processes a plurality of packets, the network element comprising:
a plurality of network interfaces that communicate the plurality of packets, the plurality of network interfaces including a plurality of ingress interfaces and a plurality of egress interfaces, each of the plurality of ingress interfaces being one of an external queue interface and an internal queue interface;
a data plane, coupled to the plurality of network interfaces, that processes the plurality of packets, the data plane including:
a plurality of external queues that stores at least one of the plurality of packets prior to this packet being transmitted by the network element on one of the plurality of egress interfaces;
a packet storage unit, coupled to the plurality of external queues, that controls the storing of the at least one of the plurality of packets in one of the plurality of external queues; and
a packet switch unit, external to and coupled to the packet storage unit, that includes a plurality of internal queues that are internal to the packet switch unit, and for each of the plurality of packets, receives that packet from one of the plurality of ingress interfaces and determines the packet is to be stored in one of the plurality of external queues based on the one of the plurality of ingress interfaces that received the packet being an external queue interface, wherein the packet switch unit further,
if the packet is to be stored in the one of the plurality of external queues, forwards that packet to the packet storage unit, and thereafter receives that packet from the packet storage unit, and
if the packet is not to be stored in the one of the plurality of external queues, stores the packet in one of the plurality of internal queues, and forwards the packet to one of the plurality of egress interfaces, wherein the network element transmits that packet with the one of the plurality of egress interfaces.

29. The network element of claim 28, wherein a first set of packets to be received on a first set of the plurality of interfaces are stored in the one of the plurality of external queues and a second set of packets to be received on a second set of interfaces are stored in one of the plurality of internal queues.

30. The network element of claim 29, wherein external flow control is enabled for the second set of the plurality of interfaces.

31. The network element of claim 29, wherein the external flow control is selected from the group consisting of 802.3x flow control and 802.1Qbb Priority Flow Control.

32. The network element of claim 29, wherein internal flow control is enabled for packets communicated between the packet storage unit and the packet switch unit.

33. The network element of claim 28, wherein the packet switch unit further identifies which of the plurality of external queues is used for the packet based on one or more characteristics of that packet.

34. The network element of claim 28, wherein the packet storage unit further identifies which of the plurality of external queues is used for the packet based on one or more characteristics of that packet.

35. A non-transitory machine-readable medium having executable instructions to cause one or more processing units to perform a method to process a plurality of packets in a network element, the method comprising:
receiving on a plurality of ingress interfaces of a packet switch unit the plurality of packets, each of the plurality of ingress interfaces configured as one of an external queue interface and an internal queue interface, wherein each external queue interface is configured to have packets received on the external queue interface queued in an external queue before being transmitted over an egress interface;
determining an externally queued subset of packets from the plurality of packets that is to be stored in an external queue, the externally queued subset of packets being packets received on ones of the plurality of ingress interfaces configured as an external queue interfaces;
determining an internally queued subset of packets from the plurality of packets that is to be stored in an internal queue, the internally queued subset of packets being packets received on ones of the plurality of ingress interfaces configured as internal queue interfaces;
forwarding the externally queued subset of packets to a packet storage unit, wherein the packet storage unit includes storage for the external queue;
receiving, with the packet switch unit, the externally queued subset of packets from the packet storage unit;
forwarding the externally queued subset of packets to an egress interface corresponding to each of the packets in the externally queued subset of packets;
storing the internally queued subset of packets in the internal queue that is internal to the packet switch unit; and
forwarding the internally queued subset of packets to an egress interface corresponding to each of the packets in the internally queued subset of packets.

* * * * *